United States Patent [19]
Dorth et al.

[11] 4,201,897
[45] May 6, 1980

[54] RINGING VOLTAGE TRANSFER CIRCUIT
[75] Inventors: John P. Dorth, Downers Grove; Robert V. Burns, Tinely Park; Lloyd A. Tarr, Elmhurst, all of Ill.
[73] Assignee: GTE Automatic Electric Laboratories Incorporated, Northlake, Ill.
[21] Appl. No.: 963,492
[22] Filed: Nov. 24, 1978
[51] Int. Cl.² .............................................. H04Q 9/00
[52] U.S. Cl. .................................................. 179/84 R
[58] Field of Search ........... 179/18 F, 18 FA, 18 HB, 179/84 R, 84 A

[56] References Cited
U.S. PATENT DOCUMENTS
3,536,852 10/1970 Dolarmore ........................ 179/84 R
3,941,939 3/1976 Holmes et al. .................. 179/18 HB Primary Examiner—Robert S. Tupper
Assistant Examiner—Joseph A. Popek
Attorney, Agent, or Firm—Robert J. Black; Gregory G. Hendricks

[57] ABSTRACT

A circuit which prepares a conductive path between a ringing voltage generator and a telephone subscriber loop circuit prior to the application of ringing voltage to the conductive path. Photo coupled switching and monitoring circuits are used to coordinate application of ringing voltage with operation of a ring relay which completes the circuit path between the ringing voltage generator and the loop circuit.

6 Claims, 2 Drawing Figures

RINGING VOLTAGE TRANSFER CIRCUIT

BACKGROUND OF THE INVENTION (1) Field of the Invention

The present invention relates to telephone subscriber supervisory circuits and more particularly to a circuit for connecting and disconnecting a ringing voltage generator to a telephone subscriber's loop circuit prior to application and after termination of ringing voltage, to said loop circuit.

(2) Description of the Prior Art

When a telephone subscriber's loop circuit is switched between a DC transmission source and a ringing voltage generator, substantial transients are typically generated by the interruption of these circuits. These transients are particularly harmful to relay contacts and digital networks.

This problem has traditionally been solved by resistor/capacitor networks, other types of contact transient suppression circuits, mercury wetted relays, or sequential relay contact operation. A contemporary approach has been to sense the absence of ringing voltage and to operate the relay performing the switching (ring relay) at the instant the ringing voltage cycle crosses zero volts. However, this approach requires precise operation of the ring relay contacts in order to switch the ringing voltage generator at the opportune time. These prior art methods all incur substantial penalty in the form of cost, size, and/or limitations on performance.

Accordingly it is an object of the present invention to provide a novel low cost, maintenance free, highly reliable technique of switching the telephone subscriber's loop between a DC transmission source and a ringing voltage generator.

SUMMARY OF THE INVENTION

The present invention is a circuit which transfers the subscriber's loop circuit between the DC transmission source and the ringing voltage generator without generating harmful electrical transients. This circuit is typically included as part of the line equipment of a telephone central office.

The circuit consists of a logic control unit connected between a processing unit included in the central office and a ring relay. The logic control unit is also connected to an optically coupled triac switch and an optically coupled voltage sensing circuit. The triac is further connected between the ringing voltage generator and the subscirber station line via a pair of make contacts on the ring relay. The sensing circuit is further connected to the circuit path between the triac and the ring relay contacts.

In order to connect the ringing voltage generator to the subscriber station, the processing unit generates a ring relay operate signal in any well-known manner. The logic control unit responds to this signal by operating the ring relay whose make contacts connect the subscriber station line to the optically coupled triac. The logic control unit then operates the triac which provides continuity and current flow between the ringing voltage generator and the subscriber station line via the ring relay contacts.

To disconnect the ringing voltage generator the processing unit generates a ring termination signal. The logic control unit responds to this signal by turning off the triac which causes an open circuit between the ringing voltage generator and the subscriber station line, terminating ringing. The optically coupled transistor circuit detects this open circuit condition and signals the logic control unit which then releases the ring relay. Therefore, the ring relay is switched dry (no current flow) allowing the use of low cost conventional relay contacts. While actual termination of ringing is under control of the triac the relay contacts are still required to protect the voltage switch (triac) from high voltage spikes that may appear on the line.

The logic control unit includes 2 D-Type flip-flops which are used to provide the delays required to operate the ring relay before the triac when connecting the ringing voltage generator to the subscriber station line, and to turn off the triac before the ring relay is released when disconnecting the ringing voltage generator.

DESCRIPTION OF THE PREFERRED EMBODIMENT

Figure 1:
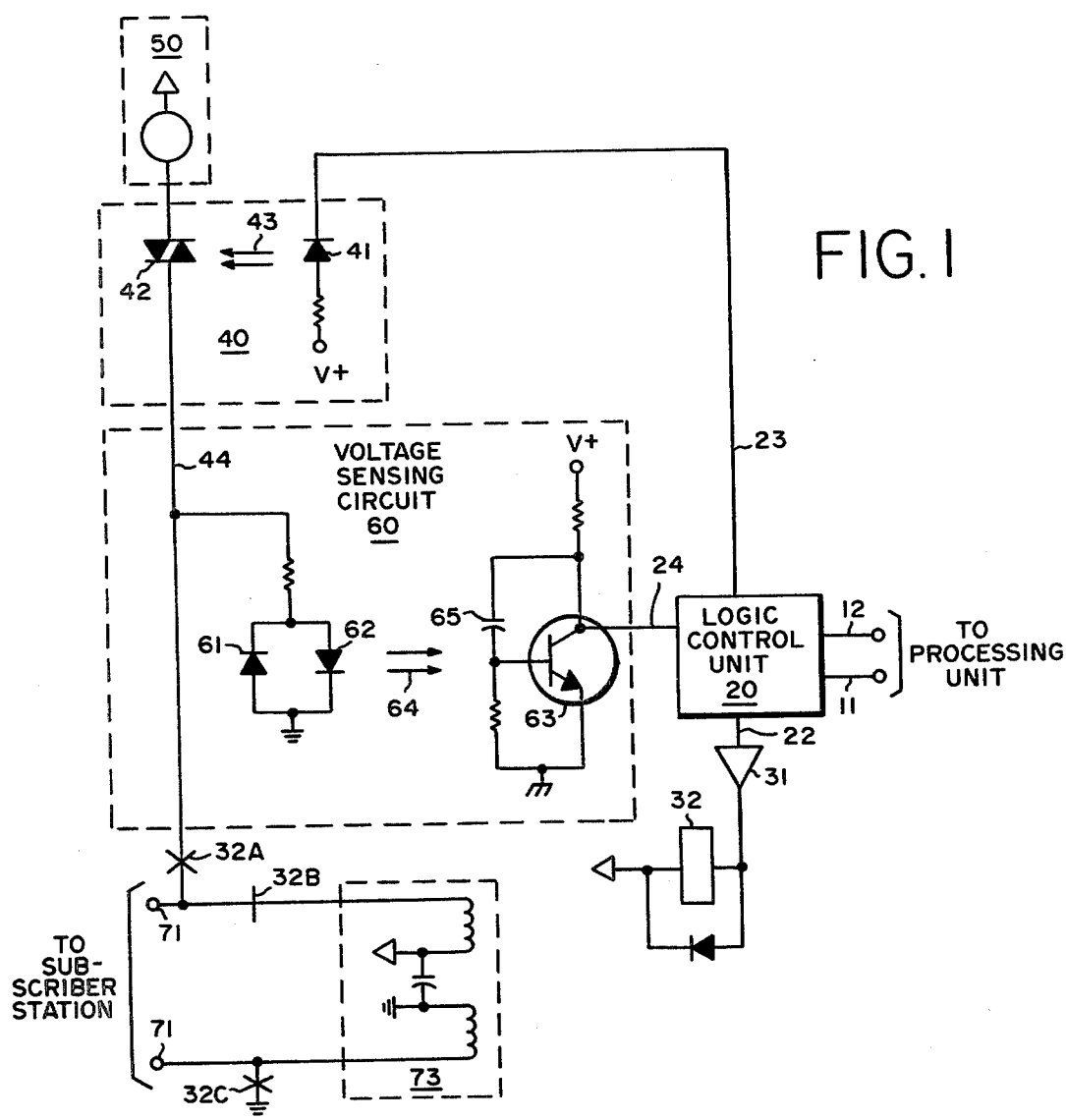
FIG. 1 is a schematic diagram of a voltage switch in accordance with the present invention.

Referring now to FIG. 1, the voltage switch of the present invention is shown connected between a processing unit, a ringing voltage generator 50 and a subscriber station line 71.

The voltage switch includes a logic control unit 20 connected to a processing unit via leads 11 and 12 and to ring relay driver 31 via lead 22. Relay driver 31 is further connected to coil 32 of the ring relay. Logic control unit 20 is also connected via lead 23 to light emitting diode 41 which is optically coupled to triac 42. Logic control unit 20 is further connected via lead 24 to transistor 63 which is optically coupled to light emitting diodes 61 and 62. These oppositely poled, parallel connected diodes are connected to circuit path 44. Ring relay make contacts 32A are included in circuit path 44 which extends between triac 42 and subscriber station line 71.

In order to connect ringing voltage generator 50 to subscriber station line 71, the processing unit generates a ring relay operate signal PRO lead 12 and a clock signal CLC on lead 11. Logic control unit 20 responds to these signals by operating ring relay 32 via relay driver 31. When ring relay 32 operates make contacts 32A connect subscriber station line 71 via circuit path 44 to triac 42, break contacts 32B disconnect transmission circuit 73 from subscriber station line 71 and make contacts 32C connect subscriber station line 71 to ground. Since triac 42 has not yet been operated ring relay 32 has been switched dry, i.e. ringing signals from ringing voltage generator 50 had not been applied to ring relay contact 32A.

Logic control unit 20 then turns "on" light emitting diode 41 which generates light signals 43. Optically coupled triac 42 turns on in response to light signals 43 and gates ringing singals from ringing voltage generator 50 to subscriber station line 71 via circuit path 44.

To disconnect ringing voltage generator 50 from subscriber station line 71, the processing unit generates ring relay release signal RRR on lead 12 and the clock signal on lead 11. Logic control unit 20 responds to these signals by turning "off" light emitting diode 41 terminating light signals 43. Optically coupled triac 42 responds to the absence of light signals 43 by conditioning itself to turn off when the ringing signals RS from ringing voltage generator 50 reach zero volts. When this occurs triac 42 turns "off" and creates an open circuit condition between ringing voltage generator 50 and circuit path 44.

Light emitting diodes 61 and 62 generate light signals 64 in response to positive and negative excursions of ringing signals RS appearing on circuit path 44. Optically coupled transistor 63 turns on in response to these light signals. When triac 42 turns off light emitting diodes 61 and 62 respond to the resultant open circuit condition on circuit path 44 by turning "off" light signals 64. Optically coupled transistor 63 turns "off" in response to the absence of light signals 64 and generates open circuit signal OC on lead 24. Logic control unit 20 responds to this signal by releasing ring relay 32 via relay driver 31. Relay contacts 32A, 32B and 32C return to their normal state and subscriber station line 71 is disconnected from ringing voltage generator 50 and reconnected to transmission circuit 73.

Figure 2:
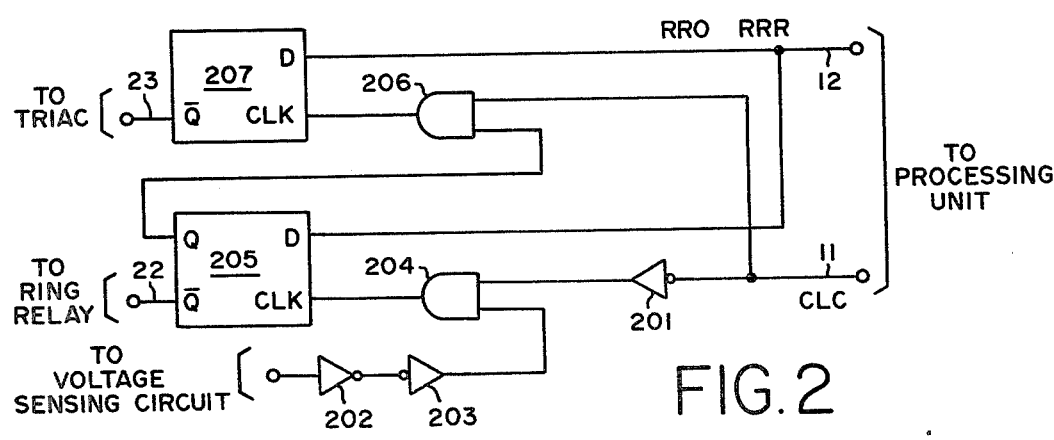
FIG. 2 is a logic diagram of the logic control unit of FIG. 1.

The detailed logic diagram of logic control unit 20 is shown in FIG. 2. The circuit includes two series connected Schmitt triggers 202 and 203 connected to lead 24, inverter 201 and gate 206 connected to lead 11 and the D inputs of flip-flops 205 and 207 connected to lead 12. The output leads of Schmitt trigger 203 and gate 201 are connected to gate 204 whose output lead is connected to the CLK lead of flip-flop 205. Gate 206 is further connected to the Q lead of flip-flop 205 and the output lead of gate 206 is connected to the CLK lead of gate 207. The $\overline{Q}$ leads (22 and 23) of gates 205 and 207 are connected to ring relay 32 and light emitting diode 41 respectively.

In order for the processing unit to connect the ringing voltage generator to the subscriber station line it applies a logic level 0 to lead 11 to represent the clock signal CLC, and a logic level 1 on lead 12 to represent signal RRO. Inverter 201 inverts the signal to a logic level 1 and applies to it And gate 204. Schmitt triggers 202 and 203 also apply a logic level 1 to And gate 204 since signal OC on lead 24 is at logic level 1 when triac 42 is turned off. Gate 204 applies a logic level 1 to the CLK lead of flip-flop 205 which causes lead 22 to switch to a logic level 0 and lead Q to switch to a logic level 1 because of the logic level 1 on its D lead. A logic level 0 on lead 22 causes ring relay 32 to operate. The processing unit must wait at least 6 msec to allow ring relay 32 to operate before removing the CLC signal. When this signal returns to logic level 1, gate 206 applies a logic level 1 to the CLK lead of flip-flop 207 because of the logic level 1 on lead Q of gate 205. This causes flip-flop 207 to switch lead 23 to a logic level 0 which turns on light emitting diode 41 and causes ringing voltage to be applied to the subscriber station line. Lead 24 is then switched to a logic level 0 in response to ringing voltage being applied to the subscriber station line.

To disconnect the ringing voltage generator from the subscriber station line, the processing unit applies a logic level 0 on lead 12 to represent signal RRR. Gate 206 responds to the logic level 1 on lead 11 and the Q lead of flip-flop 205 by generating a logic level 1 on the CLK lead of flip-flop 207 which causes lead 23 to switch to a logic level 1 because of the logic level 0 on its D lead. The resultant logic level 1 on lead 23 turns off light emitting diode 41 which causes triac 42 to turn off when the ringing signal is at a value of 0 volts. Lead OC then returns to a logic level 1 in response to triac 42 turning off. The processing unit must wait at least 25 msec after applying the RRR signal before generating the associated CLC signal. This delay is required to allow forward case timing between the turning off of the light emitting diode and the zero crossing of the ringing signal. The processing unit then applies a logic level 0 to lead 11 and inverter 201 applies a logic level 1 to gate 204. Schmitt trigger 202 and Schmitt trigger 203 also apply a logic level 1 to gate 204 in response to the logic level 1 and lead 24. Gate 204 then applies a logic level 1 to the CLK lead of flip-flop 205 which switches its $\overline{Q}$ lead to a logic level 1 because of the logic level 0 on its D lead. The logic level 1 on the $\overline{Q}$ lead of flip-flop 205 then causes ring relay 32 to release.

In this manner ring relay 32 is turned on before triac 42 and it is turned off after triac 42.

The voltage switch of the present invention allows the ring relay to be switched only when there is no ringing voltage applied across its contacts thus allowing the use of a low cost conventional ring relay. It also results in a highly reliable, maintenance free technique for switching the subscriber station between a DC transmission source and a ringing voltage generator. Relay contacts are switched only in the absence of ringing voltage thus there are no harmful arcing conditions to cause deterioration of the switching contacts.

It will be obvious to those skilled in the art that numerous modifications of the present invention can be made without departing from the spirit of the invention which shall be limited only by the scope of the claims appended hereto.

What is claimed is:

1. A voltage switch for connecting a source of ringing signals to a telephone subscriber station line, for use in a telephone system including a processing unit operated to generate first and second ring control signals, said voltage switch comprising:

switch control means connected to said processing unit initially operated in response to said first ring control signal;

first switching means connected to said switch control means operated to establish a ringing signal circuit path to said subscriber line;

second switching means connected to said switch control means, operated after a predetermined time to connect said ringing signal circuit path to said source of ringing signals, conducting said ringing signals to said line;

said switch control means further operated in response to said second ring control signal to render said second switch means inoperative and conditioned to render said first switch means inoperative;

voltage sensing means connected between said ringing signal circuit path and said switch control means, operated in response to said rendering of said second switch means inoperative to still further operate said conditioned switch control means to render said first switch means inoperative;

whereby said ringing signal source is initially connected to and further disconnected from said subscriber station only when ringing signals are not present on said ringing signal circuit path.

2. A voltage switch as claimed in claim 1, wherein: said first switching means comprise a ring relay connected to said switch control means, and a pair of make relay contacts included in said ringing signal circuit path connected to said line.

3. A voltage switch as claimed in claim 1, wherein: said second switching means comprise a triac optically coupled to a light emitting diode.

4. A voltage switch as claimed in claim 1, wherein: said voltage sensing means comprise an optically coupled transistor controlled by a pair of light emitting diodes arranged in a bipolar manner.

5. A voltage switch as claimed in claim 4, wherein: said transistor includes base and collector leads, and said voltage sensing means further comprise a capacitor connected to said base and collector leads, said capacitor operated to prevent said transistor from turning off until after an absence of current flow through said pair of light emitting diodes for a predetermined period.

6. A voltage switch as claimed in claim 1, wherein said switch control means comprise:
- a first flip-flop circuit connected to said processing unit, to said voltage sensing means and to said first switching means, operated in response to said first ring control signal from said processing unit to energize said first switching means;
- a second flip-flop circuit connected to said processing unit, to said first flip-flop circuit and to said second switching means operated in response to said first ring control signal and operation of said first flip-flop to energize said second switching means after a predetermined period;
- said second flip-flop circuit further operated in response to said second ring control signal from said processing unit to de-energize said second switching means; and
- said first flip-flop circuit further operated in response to said second ring control signal and said voltage sensing means to de-energize said first switching means.

* * * * *